US012570179B2

(12) United States Patent
Von Holst et al.

(10) Patent No.: US 12,570,179 B2
(45) Date of Patent: Mar. 10, 2026

(54) DEVICE FOR MAINTAINING AN ELECTRICALLY DRIVEN AGRICULTURAL VEHICLE

(71) Applicant: DEERE & COMPANY, Moline, IL (US)

(72) Inventors: Christian Von Holst, Hettenleidelheim (DE); Joachim F. Sobotzik, Lambsheim (DE)

(73) Assignee: DEERE & COMPANY, Moline, IL (US)

( * ) Notice: Subject to any disclaimer, the term of this patent is extended or adjusted under 35 U.S.C. 154(b) by 392 days.

(21) Appl. No.: 18/322,701

(22) Filed: May 24, 2023

(65) Prior Publication Data

US 2023/0382264 A1 Nov. 30, 2023

(30) Foreign Application Priority Data

May 25, 2022 (DE) .......................... 102022113292.7

(51) Int. Cl.
| | |
|---|---|
| B60L 53/80 | (2019.01) |
| B60L 53/30 | (2019.01) |
| B60L 53/53 | (2019.01) |
| B60L 53/66 | (2019.01) |

(52) U.S. Cl.
CPC ............... B60L 53/80 (2019.02); B60L 53/30 (2019.02); B60L 53/53 (2019.02); B60L 53/66 (2019.02); *B60L 2200/40* (2013.01)

(58) Field of Classification Search
CPC .......... B60L 53/80; B60L 53/53; B60L 53/66; B60L 53/30; B60L 2200/40
See application file for complete search history.

(56) References Cited

U.S. PATENT DOCUMENTS

| | | | |
|---|---|---|---|
| 7,610,122 B2 | 10/2009 | Anderson | |
| 8,618,766 B2 | 12/2013 | Anderson et al. | |
| 9,177,305 B2* | 11/2015 | Penilla .................. | H04W 4/029 |
| 9,891,629 B2 | 2/2018 | Murray et al. | |

FOREIGN PATENT DOCUMENTS

| | | |
|---|---|---|
| CN | 210554714 U | 5/2020 |
| CN | 113352933 A | 9/2021 |
| CN | 113352936 A | 9/2021 |
| CN | 114161986 A | 3/2022 |
| DE | 102020212018 A1 | 3/2022 |

OTHER PUBLICATIONS

Blanco," China's NIO Making EV Battery Swapping Work," https://www.sae.org/news/2019/01/nio-ev-battery-swapping (Year: 2019).*
European Search Report issued in Application No. 23171620.0, dated Nov. 8, 2023, 7 pages.

* cited by examiner

*Primary Examiner* — Aryan E Weisenfeld

(57) ABSTRACT

A device for maintaining an electrically driven agricultural vehicle includes a charging station for electrically charging a drive battery of the agricultural vehicle, an exchange station for exchanging the drive battery of the agricultural vehicle, and a receptacle space for receiving the agricultural vehicle.

14 Claims, 2 Drawing Sheets

1

DEVICE FOR MAINTAINING AN ELECTRICALLY DRIVEN AGRICULTURAL VEHICLE

CROSS-REFERENCE TO RELATED APPLICATIONS

This application claims priority to German Patent Application No. 102022113292.7, filed May 25, 2022, which is hereby incorporated by reference.

FIELD OF THE DISCLOSURE

The disclosure to a device for maintaining an electrically driven agricultural vehicle.

BACKGROUND

Agricultural or industrial utility vehicles can include an electric battery for drive power.

SUMMARY

An electric battery drive for agricultural vehicles can be a logistical and maintenance challenge for example during a work assignment on the field.

It is therefore an object of the present disclosure to simplify the handling of an agricultural vehicle equipped with an electrical battery drive.

This object is achieved by a device having the features of one or more of the following embodiments disclosed herein.

According to one embodiment, a device for maintaining an electrically driven agricultural vehicle (for example, tractor, all-terrain vehicle) has a charging station, an exchange station, and a receptacle space.

The charging station is used for electrically charging a drive battery of the agricultural vehicle. The exchange station is used to exchange the drive battery. The receptacle space is used to receive the agricultural vehicle.

The receptacle space facilitates suitable positioning of the agricultural vehicle (vehicle in short hereinafter) for its maintenance. For example, individual maintenance activities can then be carried out in an automated manner more easily. With the combined presence of the charging station, the exchange station, and the receptacle space, the device thus provides the technical and logistical requirements for efficient maintenance of the electrically driven vehicle with little work effort by personnel. For example, the drive battery can be handled in an automated manner, for example, charged or exchanged with a fully charged battery. The receptacle space also offers protection of the vehicle or the exchangeable drive battery from theft or vandalism.

In this way, the device offers advantageous logistical assistance when agricultural work is being carried out by electrically driven agricultural vehicles.

The above-mentioned maintenance can include different activities with respect to the agricultural vehicle. As already mentioned, such activities are for example charging of the drive battery at the charging station or exchanging the drive battery at the exchange station. Further maintenance activities can be carried out in an automated manner via a suitable control system.

The logistical efficiency can be assisted in that the device is designed to be mobile. The technical requirements for the desired maintenance activities in electrically driven agricultural vehicles can be provided at flexible locations in this way. With the aid of the mobile device or a plurality of such mobile devices, agricultural areas, plantations, and the like can be efficiently processed by electrically driven agricultural vehicles even without costly stationary infrastructure.

The device is designed for example as a mobile container. This may be efficiently handled for transport via corresponding transport means (e.g., truck, ship, train) and possibly further aids. Infrastructures for electrically driven agricultural vehicles which are limited with respect to location and time may thus be provided in rural areas cost-effectively and very promptly.

The mobile container is advantageously a device which is produced in a standard manner and is therefore available comparatively cost-effectively in a large number. The base of the device can be a standard sea container, for example, as a 20-inch variant or 40-inch variant with respect to the container length.

As a mobile container, the device is constructed in a mechanically stable manner (for example from steel) and can be stably fixed or fastened in the usage area on different underlying surfaces and possibly even without a foundation.

A container-type device additionally has the advantage that it can provide additional functional areas or functional spaces with little equipment expenditure. For example, a part of the container space can be configured with equipment available in standard form for workshops, cabinet or storage spaces, office spaces, or living and sleeping spaces, showers, toilets.

The device can include two receptacle spaces for an agricultural vehicle in each case. Such devices can provide the desired infrastructure for electrically driven agricultural vehicles in rural areas even more efficiently if a fleet having a larger number of agricultural vehicles is active in the agricultural work. For example, a 40-inch sea container is used for this purpose, which contains two receptacle spaces accessible facing away from one another along the container length.

The charging station of the device can be connected to an existing power grid. A power grid is often not available for the desired (for example mobile) specific use of the device, however. The device can include a separate power generating unit (e.g., via gas turbine, internal combustion engine, fuel cell), which is connected to the charging station. In this way, the device can be used flexibly in different agricultural areas. This supports an improved range of the vehicle during the work assignment.

Alternatively, the power can be provided via a mini nuclear reactor system.

Fossil fuels, synthetic fuels (for example E fuels), biogas, LPG, CNG, methanol, or hydrogen, for example, can be used as the fuel for the power generating unit. The fuel can be provided via mobile or stationary supply stores or can be led to the power generating unit via supply lines.

The device itself can have a storage unit for storing the fuel, which is required for operating the power generating unit. A power store can also be integrated in the device. Autonomous operation of the device is assisted in this way.

In one embodiment, the device has a sensor system for at least one of the following functions: recognizing or identifying the vehicle, recognizing a current position of the vehicle, and recognizing a current functional state of the vehicle.

The sensor system can be arranged in an entry area of the receptacle space of the device. The sensor system can contribute to efficient electronic communication between the device and the vehicle using its sensor signals. In this way, carrying out various maintenance activities with respect to the vehicle in an automated or autonomous manner can be assisted.

The sensor system can include various suitable sensors (e.g., camera, laser, radar, lidar, ultrasound).

For example, with the aid of the sensor signals, initially the approaching vehicle can be identified and it can be checked (for example via an electronic protocol) whether the device is provided for this vehicle. After a successful check, the current position of the vehicle can in turn be recognized via the sensor system, for example, to prompt autonomous driving (possibly including steering and braking) of the vehicle into a predetermined maintenance position within the receptacle space. A current functional state (e.g., tires, lights, vehicle body, data version) of the vehicle can also be recognized using a suitable sensor system, the sensor signals of which are evaluated, for example, in the context of a service and/or diagnostic function for the vehicle.

As already mentioned, the device offers charging of the drive battery or exchanging of the drive battery as maintenance activities for the vehicle. The maintenance activities can be carried out in an at least partially automated manner via a suitable control system, so that the effort by personnel for the desired maintenance of the vehicle is reduced in a cost-saving manner. Sensor signals of the mentioned sensor system can be received as input signals by the control system for this purpose.

Carrying out sensitive maintenance activities in an automated manner (e.g., exchanging the drive battery and establishing or disengaging the electrical contact) additionally offers the advantage that possible damage to the drive battery or the vehicle can be reliably avoided.

At least one of the following maintenance activities can be controlled in an automated or autonomous manner via the control system: controlling a vehicle function of the vehicle, for example, autonomous driving or controlling of the vehicle in the direction of a predetermined maintenance position within the receptacle space, connecting the vehicle to the charging station, charging the drive battery of the vehicle, removing the drive battery from the vehicle, inserting or installing a charged drive battery in the vehicle, connecting the vehicle to a service and/or diagnostic function, and programming the vehicle using updated data, for example, to update a data version in a control unit (e.g., a controller including a processor and memory) of the vehicle.

Automatic programming of the vehicle using updated data takes place, for example, when the drive battery is exchanged for a battery having a different capacity and therefore the vehicle or its control unit has to be informed about the changed battery parameter data.

The control system can be equipped with a computer which can provide control algorithms and data for the maintenance activities. The control system can include a controller having a processor and memory.

The operating power for the control system and possibly also for further functions of the device can be supplied by the power generating unit. In addition, an auxiliary battery can be provided for the temporary supply of individual functions (e.g., control system, exchange station, lighting) of the device with operating power, so that even without an external power grid and if the power generating unit is inactive or defective, it is possible to operate the device (with the exception of charging the drive battery). The auxiliary battery is preferably fed by at least one autonomous power source (e.g., PV surface, wind turbine). This power source can be arranged in a space-saving manner, for example, on a roof surface of the device.

In one preferred embodiment, the control system is connected to a network antenna. This network antenna is arranged at a suitable point of the device and enables a data connection of the control system to an existing external network (for example the Internet). In this way, the control system, for example its computer, can receive relevant items of information for the affected agricultural vehicles and for their maintenance via the external network (for example from an external data center) and store them in a data memory. For example, the control system receives identification data about vehicles which are allowed to be maintained in this device. In addition, the control system can download updated data via the network, which are required during maintenance for updated programming of the vehicle.

In case of a transport of the device, the control system can automatically start and carry out suitable diagnostic procedures.

In a further preferred embodiment, the control system is connected to a signal antenna, which is arranged at a suitable point of the device. In this way, a wireless local radio network (for example Wi-Fi) can be established with corresponding signal antennas of further devices in the agricultural working area. This local radio network can communicate with the vehicles on the agricultural working area and in this way coordinate a logistically and economically efficient use of the vehicles or the vehicle fleet. For example, the radio network can assist automated or autonomous work of the vehicles on the agricultural area via a data communication between the control system and the vehicles. The use of a local radio network suggests itself in cases in which the transmission performance of a publicly available data infrastructure is inadequate. This often applies to rural areas.

In addition, the control system, for example its computer, can carry out an optimization algorithm with respect to future charging processes at the charging station of the device for multiple vehicles. The device most suitable for a vehicle can be ascertained for each point in time. This assists efficient energy management for the affected vehicles. For this purpose, the optimization algorithm can take into consideration various data from a data interaction between the control system, on the one hand, and a user interface (for example internally in the vehicle or smart phone) or an autonomous operating program of the vehicle or a vehicle fleet, on the other hand.

Relevant items of information, for example, relating to the above-mentioned optimization, can be communicated to a user of the vehicle via the user interface.

A charging unit for electrically charging a battery of a further vehicle is preferably arranged on an outside of the device. This charging unit is advantageously also fed by the power generating unit of the device. In this way, the device additionally enables electrical charging of other electrically operated vehicles, such as automobiles, trucks, pedelecs, or E bicycles, the drivers of which (for example supervisors) have a relationship with the work activities of the electrically driven agricultural vehicles.

The above and other features will become apparent from the following detailed description and accompanying drawings.

BRIEF DESCRIPTION OF THE DRAWINGS

The device according to the disclosure is explained in more detail hereinafter with reference to the appended drawings. Components of comparable or corresponding function are identified here by the same reference signs. In the drawings.

DETAILED DESCRIPTION

The embodiments or implementations disclosed in the above drawings and the following detailed description are not intended to be exhaustive or to limit the present disclosure to these embodiments or implementations.

Figures 1, 2, 5:
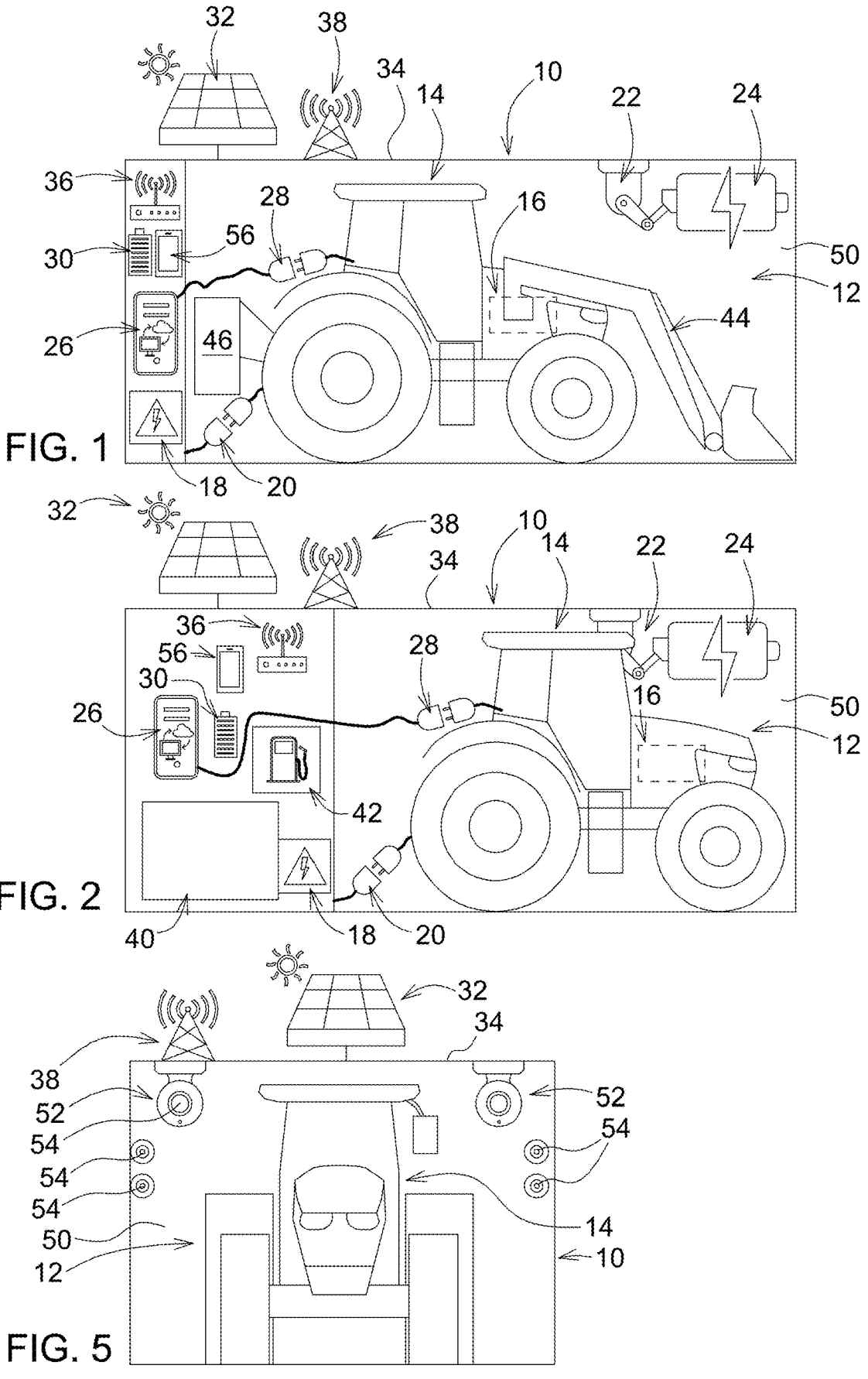
FIG. 1 shows a schematic illustration of a first exemplary embodiment of the device according to the disclosure.
FIG. 2 shows a schematic illustration of a further exemplary embodiment of the device according to the disclosure.
FIG. 5 shows a front view of the device according to the disclosure corresponding to the arrow direction V in FIG. 1.

FIG. 1 shows a device 10 having a receptacle space 12, in which an agricultural vehicle 14 in the form of a tractor is parked. The vehicle 14 is electrically driven and for this purpose contains a drive battery 16, shown schematically, preferably in a front area.

For electrically charging the drive battery 16, the device 10 contains a charging station 18 having a charging cable 20 to be connected to the vehicle 14. In addition, the device 10 contains an exchange station 22 for exchanging the drive battery 16 for a fully charged exchange battery 24.

Moreover, the device 10 contains a control system 26 having a computer for controlling various maintenance activities with respect to the vehicle 14. For example, the control system 26 can check the vehicle 14, inter alia, by reading out a version or error code, via a service and diagnostic connection 28 and if necessary can install current data and program versions or carry out measures for troubleshooting.

The operating current for the operation of various functions (for example for the control system 26 and the exchange station 22) of the device 10 is preferably provided via the power supply for the charging station 18. As a safety measure, an auxiliary battery 30 is provided, which can supply the required operating current even if the power supply for the charging station 18 should fail. The auxiliary battery 30 is charged with current which is generated by a photovoltaic system 32. The latter can be installed in a space-saving manner on a roof 34 of the device 10.

The control system 26 is connected to a network antenna 36. In this way, the control system 26 can have a data connection to an existing external network (for example the Internet).

Moreover, the control system 26 is connected to a signal antenna 38. In this way, a local radio network can be implemented with multiple vehicles 14 and/or multiple devices 10 in the region of the agricultural working area.

The power supply for the charging station 18 is preferably implemented via an external power grid or via a device-internal power generating unit 40 (FIG. 2). In the embodiment of the device 10 according to FIG. 2, a fuel for the operation of the power generating unit 40 is also provided internally in the device. For this purpose, the fuel is stored in a storage unit 42 within the device 10.

The device 10 according to FIG. 1 and FIG. 2 is a mobile container having identical external dimensions, so that a container produced in a standard manner, for example, a sea container having a length of 20 inches, can be used for both variants. Both variants differ due to the power generating unit 40 and tank unit 42, which are not provided in the device 10 according to FIG. 1. In the variant according to FIG. 1, the charging station 18 is then preferably supplied via an external power grid or an external power store. For this reason, the receptacle spaces 12 are dimensioned differently in both variants. While the larger receptacle space 12 can receive a vehicle 14 or a tractor having a front loader 44 and a rear attachment 46 (FIG. 1), the smaller receptacle space 12 is suitable for receiving a vehicle 14 without such working devices (FIG. 2).

Figures 3, 4:
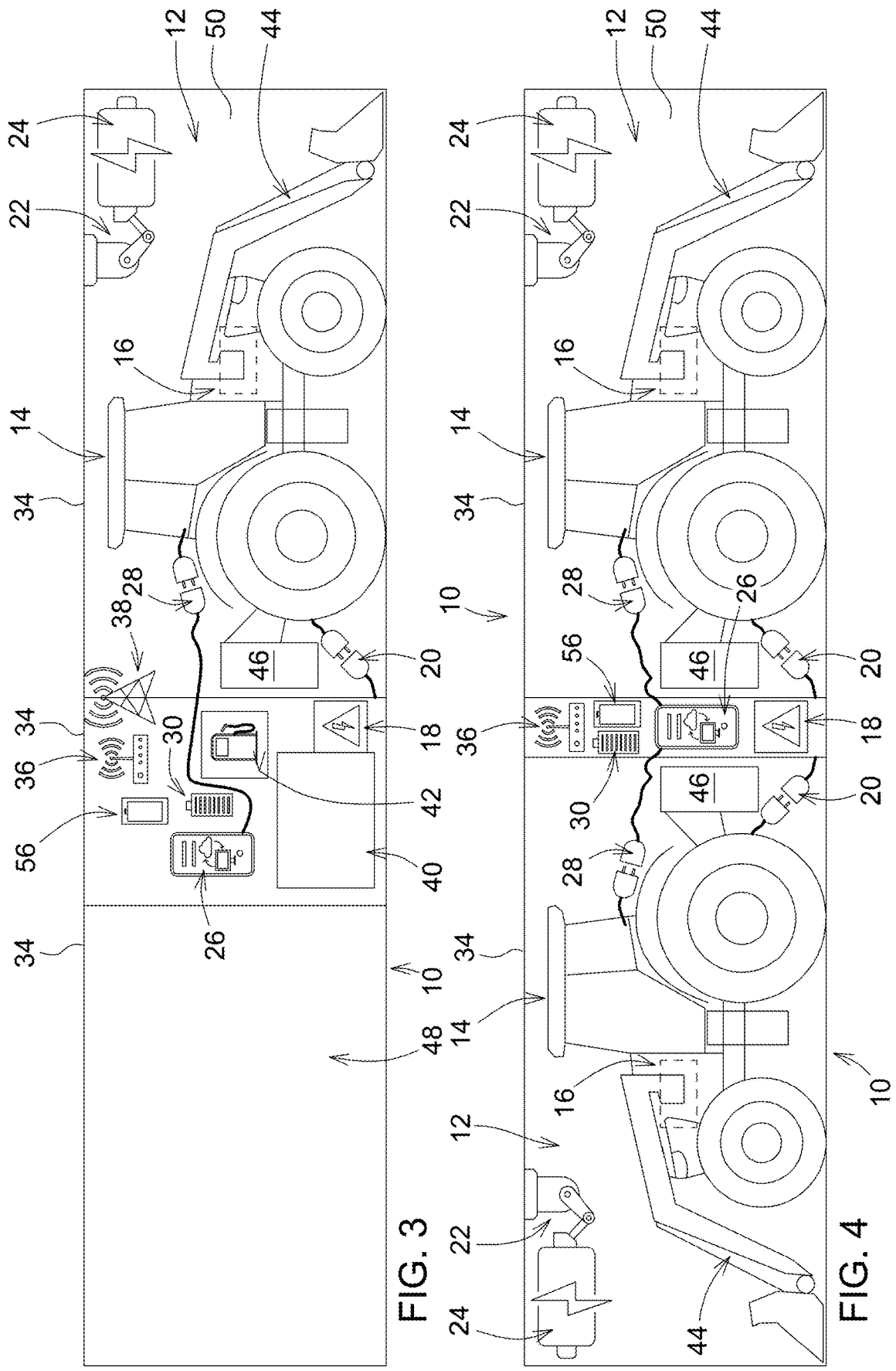
FIG. 3 shows a schematic illustration of a further exemplary embodiment of the device according to the disclosure.
FIG. 4 shows a schematic illustration of a further exemplary embodiment of the device according to the disclosure.

FIG. 3 shows the mobile device 10 in a larger container variant, for example, having a length of 40 inches. Further possibilities for the design and use of the device 10 result in this way. The device 10 can have an additional space 48 for different purposes (e.g., office, shower, toilet, break room, storage room) (FIG. 3) or include a second receptacle space 12 for a second agricultural vehicle 14 (FIG. 4). In the device 10 according to FIG. 4, there may not be space for integration of the power generating unit 40 and the tank unit 42.

The device 10 according to FIG. 4 can be modified in that at least one receptacle space 12 is exchanged for a shorter receptacle space 12 according to FIG. 2. The device 10 according to FIG. 4 then also has the required space for integration of the power generating unit 40 and the tank unit 42.

It is apparent in FIG. 5 that a sensor system 52 having multiple sensor units 54 (e.g., camera, laser, radar, lidar, ultrasound) is arranged in an entry area 50 of the receptacle space 12. The sensor system 52 is preferably connected to the control system 26 and can send sensor signals as input signals to the control system 26. Via the sensor system 52, in a wireless manner for example, an incoming vehicle 14 can be identified and/or a current position of the vehicle 14 can be recognized and/or a current functional state of the vehicle 14 can be recognized.

An entry of the vehicle 14 into the receptacle space 12 and its maintenance (for example, charging of the drive battery 16) can be dependent on a successful identification of the vehicle 14 by the device 10.

As soon as the vehicle 14 is located in its predetermined position within the receptacle space 10 and is releasably fixed or locked in an automated manner in this position by suitable means, the device 10 can carry out automated maintenance of the vehicle 14. For example, the vehicle 14 can effectuate automatic opening of the battery compartment. An automated mechanism of the exchange station 22 can then electrically disconnect the discharged drive battery 16 and remove it and then transfer it into a storage position. The exchange station 22 can thereupon grasp the fully charged exchange battery 24 and install it in the vehicle 14, including electrical contacting. The vehicle 14 can then automatically close the battery compartment again.

Furthermore, the exchange station 22 can transfer the drive battery 16, which was removed from the vehicle 14 and stored, into a charging position, in which the discharged drive battery 16 is connected in an automated manner to the charging station 18 and electrically charged.

An electronic communication between the vehicle 14, the control system 26, and possibly a user of the vehicle 14 can assist an individual decision as to whether the drive battery 16 is to be exchanged for a rapid continuation of the agricultural work assignment or whether the drive battery 16 is to be charged while remaining in the vehicle 14. In the latter case, the vehicle 14 parks during the charging in the receptacle space 12 and can preferably be programmed using updated data or program versions via the service and diagnostic connection 28.

The above-mentioned electronic communication can also be used to assist other maintenance activities with respect to the vehicle 14. Further technical functions of the device such as the power generating unit 18, a locking mechanism for releasable locking of the vehicle 14 in the receptacle space 12, the auxiliary battery 30, or the power source 32 can therefore also be incorporated in the communication.

The electronic communication can be carried out wirelessly and/or via the service and diagnostic connection 28 and/or via a user interface 56 (for example a smart phone).

For the sake of good order, it should be mentioned that at least some of the details disclosed in the drawings are depicted schematically and/or not necessarily to scale.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A mobile container for maintaining an electrically driven agricultural vehicle, the mobile container comprising:

a charging station for electrically charging a drive battery of the agricultural vehicle;

an exchange station for exchanging the drive battery of the agricultural vehicle;

a receptacle space for receiving the agricultural vehicle;

a sensor system, including one or more sensors arranged in an entry area of the receptacle space, for recognizing the agricultural vehicle, recognizing a current position of the agricultural vehicle, and recognizing a current functional state of the agricultural vehicle; and a control system, including a controller having a processor and memory, for receiving input signals from the sensor system, controlling the agricultural vehicle into a predetermined maintenance position within the receptacle space, connecting the agricultural vehicle to the charging station, charging the drive battery of the agricultural vehicle, removing the drive battery from the agricultural vehicle, inserting a charged drive battery into the agricultural vehicle, connecting the agricultural vehicle to a service and diagnostic connection, and programming the agricultural vehicle using updated data via the service and diagnostic connection.

2. The mobile container of claim 1, further comprising a second receptacle space for a second agricultural vehicle.

3. The mobile container of claim 1, further comprising a power generating unit connected to the charging station, the power generating unit provided internally in the mobile container.

4. The mobile container of claim 3, further comprising a storage unit for storing a fuel for the operation of the power generating unit, the storage unit provided internally in the mobile container.

5. The mobile container of claim 1, further comprising a network antenna, wherein the control system is connected to the network antenna for connection to an external network.

6. The mobile container of claim 1, further comprising a signal antenna, wherein the control system is connected to the signal antenna to establish a local radio network.

7. The mobile container of claim 1, further comprising an auxiliary battery for temporarily supplying a function with an operating current, wherein the auxiliary battery is charged with current generated by a photovoltaic system on a roof of the mobile container.

8. A mobile container for maintaining an electrically driven agricultural vehicle, the mobile container comprising:

a charging station for electrically charging a drive battery of the agricultural vehicle;

an exchange station for exchanging the drive battery of the agricultural vehicle;

a receptacle space for receiving the agricultural vehicle;

a sensor system, including one or more sensors arranged in an entry area of the receptacle space, for recognizing the agricultural vehicle, recognizing a current position of the agricultural vehicle, and recognizing a current functional state of the agricultural vehicle; and a control system, including a controller having a processor and memory, for receiving input signals from the sensor system, automated controlling of the agricultural vehicle into a predetermined maintenance position within the receptacle space, automated connecting of the agricultural vehicle to the charging station, automated charging of the drive battery of the agricultural vehicle, automated removing of the drive battery from the agricultural vehicle, automated inserting of a charged drive battery into the agricultural vehicle, automated connecting of the agricultural vehicle to a service and diagnostic connection, and automated programming of the agricultural vehicle using updated data via the service and diagnostic connection.

9. The mobile container of claim 8, further comprising a second receptacle space for a second agricultural vehicle.

10. The mobile container of claim 8, further comprising a power generating unit connected to the charging station, the power generating unit provided internally in the mobile container.

11. The mobile container of claim 10, further comprising a storage unit for storing a fuel for the operation of the power generating unit, the storage unit provided internally in the mobile container.

12. The mobile container of claim 8, further comprising a network antenna, wherein the control system is connected to the network antenna for connection to an external network.

13. The mobile container of claim 8, further comprising a signal antenna, wherein the control system is connected to the signal antenna to establish a local radio network.

14. The mobile container of claim 8, further comprising an auxiliary battery for temporarily supplying a function with an operating current, the auxiliary battery being charged with current generated by a photovoltaic system on a roof of the mobile container.

* * * * *